(12) United States Patent
Bird et al.

(10) Patent No.: US 7,668,805 B2
(45) Date of Patent: Feb. 23, 2010

(54) SYSTEM AND METHOD FOR MANAGING QUERY ACCESS TO INFORMATION

(75) Inventors: Paul Miller Bird, Markham (CA); Curt Lee Cotner, Gilroy, CA (US); Patrick Dantressangle, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 10/931,535

(22) Filed: Sep. 1, 2004

(65) Prior Publication Data

US 2005/0097090 A1 May 5, 2005

(30) Foreign Application Priority Data

Oct. 29, 2003 (CA) .................................. 2447458

(51) Int. Cl.
*G06F 17/30* (2006.01)
(52) U.S. Cl. ..................... 707/3; 707/2; 707/4; 707/5
(58) Field of Classification Search .................. 707/3
See application file for complete search history.

(56) References Cited

U.S. PATENT DOCUMENTS

| | | | | |
|---|---|---|---|---|
| 4,446,525 A * | 5/1984 | Hoch et al. | ................. | 700/181 |
| 5,802,255 A * | 9/1998 | Hughes et al. | ................. | 706/59 |
| 5,875,334 A * | 2/1999 | Chow et al. | ................. | 717/141 |
| 5,966,535 A * | 10/1999 | Benedikt et al. | ............ | 717/147 |
| 6,327,509 B1 | 12/2001 | Ashida | ............................ | 700/5 |
| 6,487,552 B1 * | 11/2002 | Lei et al. | ........................ | 707/4 |
| 6,578,037 B1 * | 6/2003 | Wong et al. | ..................... | 707/10 |
| 6,631,371 B1 * | 10/2003 | Lei et al. | ......................... | 707/4 |
| 6,785,673 B1 * | 8/2004 | Fernandez et al. | ............. | 707/3 |
| 6,826,727 B1 * | 11/2004 | Mohr et al. | .................. | 715/235 |
| 6,985,904 B1 * | 1/2006 | Kaluskar et al. | ................ | 707/3 |
| 7,100,195 B1 * | 8/2006 | Underwood | .................... | 726/2 |
| 7,107,578 B1 * | 9/2006 | Alpern | ......................... | 717/124 |
| 7,117,504 B2 * | 10/2006 | Smith et al. | .................. | 719/328 |
| 7,120,596 B2 * | 10/2006 | Hoffman et al. | .............. | 705/28 |
| 7,272,589 B1 * | 9/2007 | Guay et al. | ...................... | 707/2 |
| 7,437,614 B2 * | 10/2008 | Haswell et al. | ................ | 714/38 |

(Continued)

OTHER PUBLICATIONS

Masterson, dBase Language Reference with Annotations, Feb. 23, 1994, Random House Electronic Publishing, p. 336-341.*

(Continued)

*Primary Examiner*—Khanh B Pham
(74) *Attorney, Agent, or Firm*—Kunzler & McKenzie

(57) ABSTRACT

A system, computer usable medium and computer-based method for supporting named memory variables in an information retrieval system including a relational database. PUBLIC and PRIVATE named memory variables can be created, referenced, modified or deleted using SQL statements. The information retrieval system allocates a memory area as a named variable storage space for storing named memory variables. System catalogs may be used for storing information about PUBLIC, SECURE PUBLIC, PRIVATE, SECURE PRIVATE and pre-defined named memory variables. PUBLIC and PRIVATE named memory variables can be used for transferring information between SQL statements of one or more sessions or for retrieving system information from the relational database. Both PUBLIC and PRIVATE types can be defined as SECURE named memory variables requiring specific authorization privileges to read or write to the variable.

21 Claims, 6 Drawing Sheets

U.S. PATENT DOCUMENTS

| | | | | |
|---|---|---|---|---|
| 2002/0038300 | A1* | 3/2002 | Iwata et al. | 707/5 |
| 2004/0003278 | A1* | 1/2004 | Chen et al. | 713/200 |
| 2004/0044739 | A1* | 3/2004 | Ziegler | 709/213 |
| 2004/0088158 | A1* | 5/2004 | Sheu et al. | 704/9 |
| 2004/0139043 | A1* | 7/2004 | Lei et al. | 707/1 |
| 2004/0193420 | A1* | 9/2004 | Kennewick et al. | 704/257 |
| 2007/0294233 | A1* | 12/2007 | Sheu et al. | 707/3 |
| 2007/0300161 | A1* | 12/2007 | Bhatia et al. | 715/745 |
| 2008/0189303 | A1* | 8/2008 | Bush et al. | 707/100 |

OTHER PUBLICATIONS

Naumovich, "A Conservative Algorithm for Computing the Flow of Permissions in Java Programs", Jul. 2002, ACM SIGSOFT, ACM Press, p. 33-43. <Retrieved from ACM Portal Sep. 28, 2008>.* www.netdummy.net, "CPU Price List", Aug. 28, 2003, p. 1-3, <Retrieved from archive.org>.*

JDR Microdevices, "MCT-M486PV-B Motherboard MCT-M486PV133 Motherboard and Processor", Feb. 1998, <Retrieved from internet>.*

Deriving A Distributed Memory Model from a Shared Memory Model, Sep. 1993, IBM Technical Disclosure Bulletin, vol. 36, No. 09A, pp. 467-469.

Symes M., An Interface Between Java and APL, APL Berlin 2000 Proceedings, pp. 228-240.

Panconesi A. et al., Randomized naming using wait-free shared variables, Distributed Computing, vol. 11, No. 3, Aug. 1998, ISSN 0178-2770, pp. 114-124.

Harris J., Vivek S., Lighweight Object-Oriented Shared Variables for Distributed Applications on the Internet, 1998, ACM 1-58113-005-8/98/0010, pp. 296-309.

* cited by examiner

SYSTEM AND METHOD FOR MANAGING QUERY ACCESS TO INFORMATION

BACKGROUND OF THE INVENTION

1. Field of the Invention

The present invention relates to information retrieval systems, and more specifically, relates to managing query access to information.

2. Description of Related Art

Relational database systems are widely used for storing and retrieving information. Typically, relational database systems have a database including tables of data stored on a data storage medium, such as disk, and a relational database management system (RDBMS) for managing the database and providing an interface thereto. The RDBMS is responsible for processing requests to access the information in the database, for client applications, which requests are typically formalized in the Structured Query Language (SQL). To make requests and receive responses, client applications typically connect to the RDBMS and conduct the communications within a session. Connection and session management at the RDBMS is a typical manner of sharing resources among a plurality of client applications.

Traditionally, in order to share information between different SQL statements in the same session, or between different database sessions, the client application issuing the SQL statements either must copy the values from the set of input/output arguments (e.g. host variables) of one statement to those of another or write the values to a table in the RDBMS with one statement and read them from that table with the next statement. Thus, sharing information between SQL statements traditionally requires that the client application provide the mechanism and logic necessary to transport the information and the used SQL statements must intrinsically understand and use the same client mechanism. Also, SQL statements defined and contained within the database system itself, such as SQL statements used to define triggers and views, could not access this information at all if it was contained in the client application's memory. Another problem encountered by RDBMS products is that access to internal system information by SQL statements has traditionally been done via SQL special registers but these registers must be defined and implemented within the SQL language and the SQL Compiler in the relational database system before the special register may be used. This overhead slows the introduction of access to internal information desired by users of relational database systems and forces users to wait for the relational database system vendor to implement the new special register.

Overall, these restrictions limit the flexibility of relational database systems and, thus, the ability of users of such systems to implement complex, interactive models within the database itself. Users are forced to implement supporting logic inside their client applications or stored procedures (i.e. independent routines containing both logic as well as SQL statements, all of which are stored in the database for later invocation) in order to access and transfer information from SQL statement to SQL statement within a relational database system. Ensuring the security of the information being transferred and accessed is also left to the user to enforce in their application logic.

Therefore, there is a need for a simple, optimized and generic method for permitting query access to the information, in a system for information retrieval adapted to receive and respond to queries for information stored in a database, which mitigates the shortcomings and problems related to known technology.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method for supporting named memory variables in an information retrieval system including a relational database. PUBLIC and PRIVATE named memory variables can be created, referenced, modified or deleted using SQL statements. The information retrieval system allocates a memory area as a named variable storage space for storing named memory variables. System catalogs may be used for storing information about PUBLIC, SECURE PUBLIC, PRIVATE, SECURE PRIVATE and pre-defined named memory variables. PUBLIC and PRIVATE named memory variables can be used for transferring information between SQL statements of one or more sessions or for retrieving system information from the relational database. Both PUBLIC and PRIVATE types can be defined as SECURE named memory variables requiring specific authorization privileges to read or write to the variable.

Another preferred embodiment of the present invention is a system implementing the above-mentioned method embodiment of the present invention.

Yet another preferred embodiment of the present invention includes a computer usable medium tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
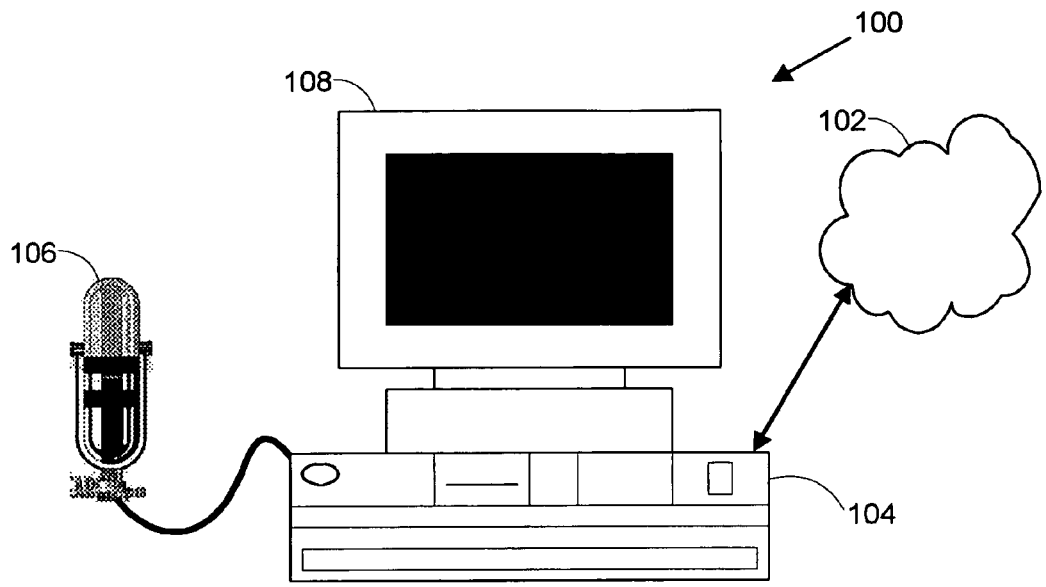
FIG. 1 schematically illustrates a computer system embodying aspects of the invention.

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, a method and a computer usable medium embodying a program of instructions executable by a computer to perform the method of the present invention for permitting and providing query access to the information, for an information retrieval system for managing query access to information stored in a database. The method includes permitting a first query to access the information stored in the database and transferring the accessed information from the first query to the second query.

To overcome the noted restrictions of the conventional systems and to maximize the flexibility of an information retrieval system, such as a relational database system, the present invention introduces the concept of a named memory variable which may be named, accessed and modified by the user through use of adapted SQL statements supported by a correspondingly adapted SQL compiler of the RDBMS. A named memory variable, in use, is allocated a named block of memory coupled to the RDBMS that can be associated within an individual database session (i.e. it is PRIVATE) or to all database sessions (i.e. it is PUBLIC). A named memory variable can also be defined as being SECURE, which enforces a set of authorization controls on the ability to read or modify that variable. Named memory variables can be defined by the user or can be provided in the form of pre-defined named memory variables by the RDBMS or database vendor.

With the introduction of named memory variables and a set of SQL statements to manipulate them, users are facilitated with a further tool to build client applications for a relational database where information can be shared between SQL statements, on the same or different sessions, or can be accessed by SQL statements defined and contained within the database system, all without any requirement for application logic to support this transfer of information. Further, where security of the information is an issue, the use of SECURE variables provides the required security, again without any application logic. Finally, database vendors may easily introduce access to additional internal information through the simple addition of a new pre-defined variable name.

In accordance with an aspect the present invention provides a method, in an information retrieval system adapted to receive and respond to queries for information, for permitting query access to the information. The method utilizes a named memory variable, which is allocated a portion of a memory coupled to the information retrieval system, to facilitate the transfer of information between queries and for processing the queries in accordance with the facility. The method permits a first query to access the information stored in the database, where at least some of the accessed information defines a particular named memory variable, and to transfer the information from the first query to a second query using the particular named memory variable.

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language or other computer programming languages in conjunction with C/C++. Any limitations presented would be a result of a particular type of operating system, computer programming language or data processing system, and would not be a limitation of the present invention.

An embodiment of the invention, computer system 100, is illustrated in FIG. 1. Computer system 100, which is illustrated for exemplary purposes as a computing device, is adapted to communicate with other computing devices (not shown) using network 102. As will be appreciated by those of ordinary skill in the art, network 102 may be embodied using conventional networking technologies and may include one or more of the following: local networks, wide area networks, intranets, the Internet, and the like.

Through the description herein, an embodiment of the invention is illustrated with aspects of the invention embodied solely in computer system 100. As will be appreciated by those of ordinary skill in the art, aspects of the invention may be distributed amongst one or more networked computing devices which interact with computer system 100 using one or more networks such as, for example, network 102. However, for ease of understanding, aspects of the invention have been embodied in a single computing device—computer system 100.

Computer system 100 typically includes a processing system 104, which is enabled to communicate with the network 102, and various input devices 106 and output devices 108. Input devices 106, such as a keyboard and mouse, as shown, may also include a scanner, an imaging system (e.g., a camera, etc.) or the like. Similarly, output devices 108, such as a display, as shown, may also include printers and the like. Additionally, combination input/output (I/O) devices may also be in communication with processing system 104. Examples of conventional I/O devices (not shown in FIG. 1) include: removable recordable media (e.g., floppy disk drives, tape drives, CD-ROM drives, DVD-RW drives, etc.), touch screen displays and the like.

Figure 2:
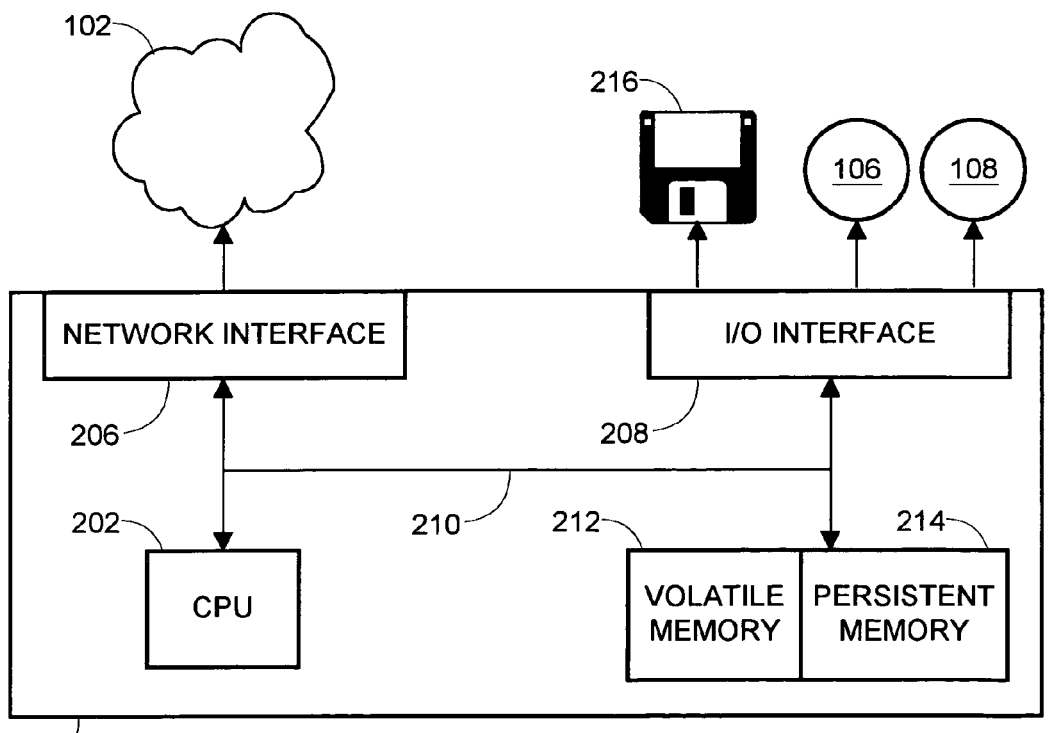
FIG. 2 schematically illustrates, in greater detail, a portion of the computer system of FIG. 1.

Exemplary processing system 104 is illustrated in greater details in FIG. 2. As illustrated, processing system 104 includes a number of components: a central processing unit (CPU) 202, memory 204, network interface (I/F) 206 and input-output interface (I/O I/F) 208. Communication between various components of the processing system 104 may be facilitated via a suitable communications bus 210, as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 104 could use alternative CPUs and may include embodiments in which two or more CPUs are employed (not shown). CPU 202 may include various support circuits to enable communication between itself and the other components of processing system 104.

Memory 204 includes both volatile memory 212 and persistent memory 214 for the storage of: operational instructions for execution by CPU 202, data registers, application and thread storage and the like. Memory 204 preferably includes a combination of random access memory (RAM), read only memory (ROM) and persistent memory, such as that provided by a hard disk drive.

Network I/F 206 enables communication between other computing devices (not shown) and other network computing devices via network 102. Network I/F 206 may be embodied in one or more conventional communication devices. Examples of a conventional communication device include: an Ethernet card, a token ring card, a modem or the like. Network I/F 206 may also enable the retrieval or transmission of instructions for execution by CPU 202, from or to a remote storage media or device, via network 102.

I/O I/F 208 enables communication between processing system 104 and the various I/O devices 106 and 108. I/O I/F 208 may include, for example, a video card for interfacing with an external display, such as output device 108. Additionally, I/O I/F 208 may enable communication between processing system 104 and a removable media 216. Removable media 216 may include a conventional diskette or other removable memory devices, such as Zip™ drives, flash cards, CD-ROMs, static memory devices and the like. Removable media 216 may be used to provide instructions for execution by CPU 202 or as a removable data storage device.

Figure 3:
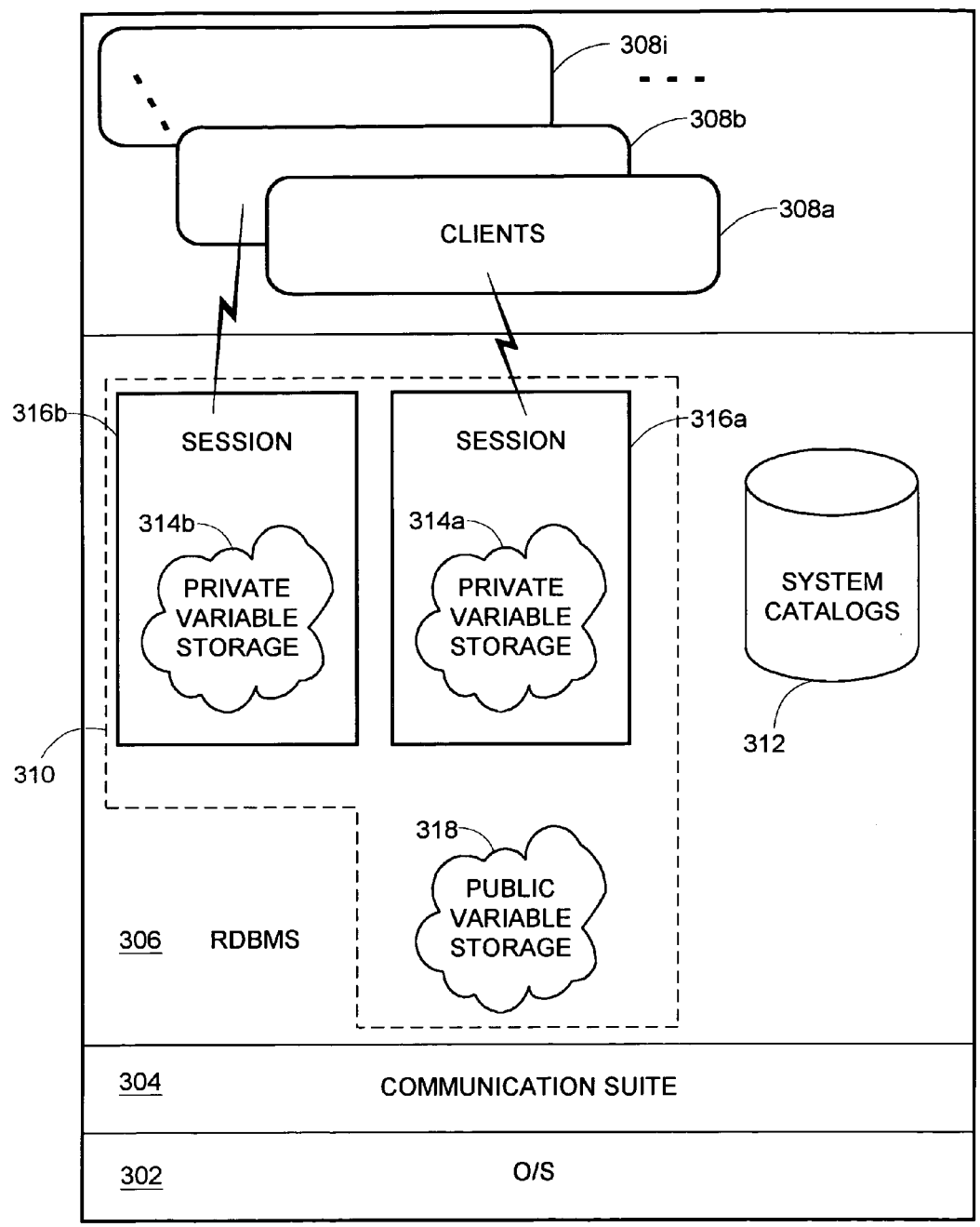
FIG. 3 illustrates, in functional block form, a portion of the memory illustrated in FIG. 2.

Computer instructions/applications stored in memory 204 and executed by CPU 202, thus adapting the operation of the computer system 100 as described herein, are illustrated in functional block form in FIG. 3. As will be appreciated by those of ordinary skill in the art, the discrimination between aspects of the applications illustrated as functional blocks in FIG. 3 is somewhat arbitrary in that the various operations attributed to a particular application as described herein may, in an alternative embodiment, be subsumed by another application.

As illustrated for exemplary purposes only, memory 204 stores a number of applications and data for enabling the operation of the system for supporting named memory variables in a relational database that includes: an operating system (OS) 302, a communication suite 304, a relational database management system (RDBMS) 306 and one or more client applications 308 (multiple client applications 308a, 308b, 308i are shown). Each of the client applications 308 is adapted to communicate with RDBMS 306 using SQL statements (not shown).

Each application 308 that establishes a session with RDBMS 306 is assigned an individual session (e.g. 316a, 316b) storage area from a named memory variable storage space 310 for storing private named memory variables (e.g. 314a and 314b). RDBMS further has a public variable storage space 318 to store variables for use within different sessions and one or more system catalogs 312 which may define the public variables. A system catalog is a RDBMS system table composed of metadata about the RDBMS and other components of the database. The metadata may be provided as one or more rows of attributes for particular database objects. For example, each catalog row or tuple may include various attributes of a database object, such as its object name, internal ID, and type (e.g., system table, user table, view, stored procedure, trigger, etc.), among other information. In accordance with the invention, the metadata may include a reference to or definition for a named variable, particularly a PUBLIC named variable, which variable may be SECURE or a SECURE PRIVATE or PRIVATE named variable.

In the illustrated example the client applications 308 are run on the same computer system 100 but it will be understood by persons skilled in the art that the client applications 308 can be run on different computer systems that are enabled to communicate with the computer system 100 using the network 102.

OS 302 is an operating system suitable for operation with a selected CPU 202 and the operations described herein. Multi-tasking, multi-threaded OSs such as, for example, IBM AIX™, Microsoft Windows 2000™, Linux™ or the like, are expected to be preferred in many embodiments. Communication suite 304 provides, through interaction with the OS 302 and the network I/F 206 (FIG. 2), suitable communication protocols to enable communication with other networked computing devices via the network 102 (FIG. 1). Communication suite 304 may include one or more of such protocols, such as TCP/IP, Ethernet, token ring and the like. Communications suite 304 preferably includes asynchronous transport communication capabilities for communicating with other computing devices.

RDBMS 306 is a software application executable in the environment of OS 302 in order to manage information stored in a relational database (not shown) and provide this information to client applications 308, on request. Client applications 308 can also be run in the environment of OS 302 or can be run on other computer systems adapted to communicate with a computer system 100 using the network 102.

Typically, each of client applications 308 interacts with RDBMS 306 in a session which is a series of interactions between one of client applications 308 and a relational database from RDBMS 306. Typically, a client application 308 requests a connection with RDBMS 306 and if RDBMS 306 replies agreeing to the connection, the client application 308 and RDBMS 306 take turns exchanging commands and data. The session begins when the connection is established at the client applications 308 and RDBMS 306 and terminates when the connection is ended.

In accordance with the invention, RDBMS 306 provides named memory variables which can be created, named, accessed, modified and dropped by client applications 308, for transferring information between SQL statements.

The information stored in named memory variables can be accessed by SQL statements defined and contained within the database system, without any requirement for client application logic to support this transfer of information. Where specific security restrictions must be applied, the use of SECURE variables provides the security without any modification application logic and thus without modifying the programming code of the client applications. Finally, database vendors may easily grant access to database internal information through the simple addition of a new predefined variable name.

Each named memory variable is saved in a named block of memory. The named block can be for a private variable which is used within an individual session 316a, 316b of respective client applications 308a, 308b or for a public variable which can be used within more than one session. Private variables are stored to private variable storages 314a, 314b and public variables are stored to a public variable storage 318. Any named memory variable can also be defined as being SECURE. Secure variables require a predetermined set of authorization controls for enabling operations, such as reading or modifying the contents of the session variable. Named memory variables can be defined by the client application and/or can be provided in a predefined form by the database vendor.

In accordance with the invention, a set of SQL statements to support named memory variables are provided and the RDBMS 306 is adapted to process such statements to create, manipulate and remove named memory variables.

For example, the CREATE VARIABLE statement is provided to create a named variable. It may have a syntax such as:

CREATE VARIABLE variable name, data type, variable attributes

The data type specifies the data type of the variable which may be restricted by the implementation for performance or other reasons. Exemplary variable attributes include PUBLIC or PRIVATE, indicating whether the named variable is to have a common value for all sessions or a unique value for individual sessions. Further, for a PRIVATE variable, a LIFETIME attribute may be used to define the duration that the value will be maintained. LIFETIME SESSION specifies that the value will remain throughout the session while LIFETIME TRANSACTION specifies that the value will remain until the current unit of work ends. Once the LIFETIME expires, the value will be set to a default specified by variable parameter DEFAULT. DEFAULT may be defined with reference to a function, constant, special register or other value.

The following example creates a private named memory variable to indicate which printer to use for the session:
  CREATE VARIABLE my_job_prt VARCHAR (30)
  PRIVATE LIFETIME SESSION
  DEFAULT 'Default Printer'

Information on created public and private session variables may be stored to one of system catalogs 312. A view of the system catalog may be created to for the information such as:

| | |
|---|---|
| VARIABLESCHEMA | The schema for naming private and public variables |
| VARIABLENAME | The variable name |
| TYPESCHEMA | The schema of the data type |
| TYPE | The name of the data type |
| LENGTH | The maximum length of the variable |
| SCALE | The scale of the variable |
| VOLATILITY | Whether the value can change during a statement execution |
| LIFETIME | Duration of value: SESSION or TRANSACTION |
| DEFAULT | Default value |

The named variable information may include a variable name, a data type, a maximum length of the variable, a scale of the variable, an indication whether a value for the named memory variable may change during an execution of the query, duration for the value and an initial default value for the named memory variable.

A session variable may be referenced directly by any SQL statement or, if a default value is to be provided in the event of a session variable not being defined at time of reference, an indirect mechanism, such as the GETVARIABLE function, can be used. The GETVARIABLE function returns a variable length character string representation of the current value of the named memory variable identified by a string expression. An optional default value (e.g. NULL) may be specified to be returned to avoid getting an error, if the request issuer does not have an appropriate READ privilege for the variable.

The DROP statement deletes a named memory variable from the database. A DROP statement may have the syntax:
  DROP VARIABLE variable name [RESTRICT|CASCADE]

The optional RESTRICT qualifier specifies that the variable cannot be dropped, if it is referenced in or by a dependent object. CASCADE deletes the variable in any event. All constraints that reference the variable are dropped. All triggers and view that reference the variable are made inoperable. All packages dependent on a dropped object are invalidated.

Privileges on a secure public or secure private named memory variable may be granted via a GRANT statement:
  GRANT READ|WRITE|READ WRITE ON VARIABLE variable name
  TO authorization name|PUBLIC [WITH GRANT OPTION]

More than one authorization name may be specified. WITH GRANT OPTION permits the grantee to further grant privileges to others. A REVOKE statement similarly revokes privileges. The following example grants read and write privileges on variable myjob_ptr to a user FRED:
  GRANT READ WRITE ON VARIABLE myjob_ptr TO FRED A SET statement is provided to assign values to variables, provided there are adequate privileges held. For example, the following statement assigns the maximum values of the salary compensation columns to the two session variables, counting commission as part of the salary and excluding the president's values:

SET (session.max_salary, session.max_bonus)=(SELECT MAX(salary+comm.), MAX(bonus))
  FROM employee
  Where job<>'Pres')

Figure 4:
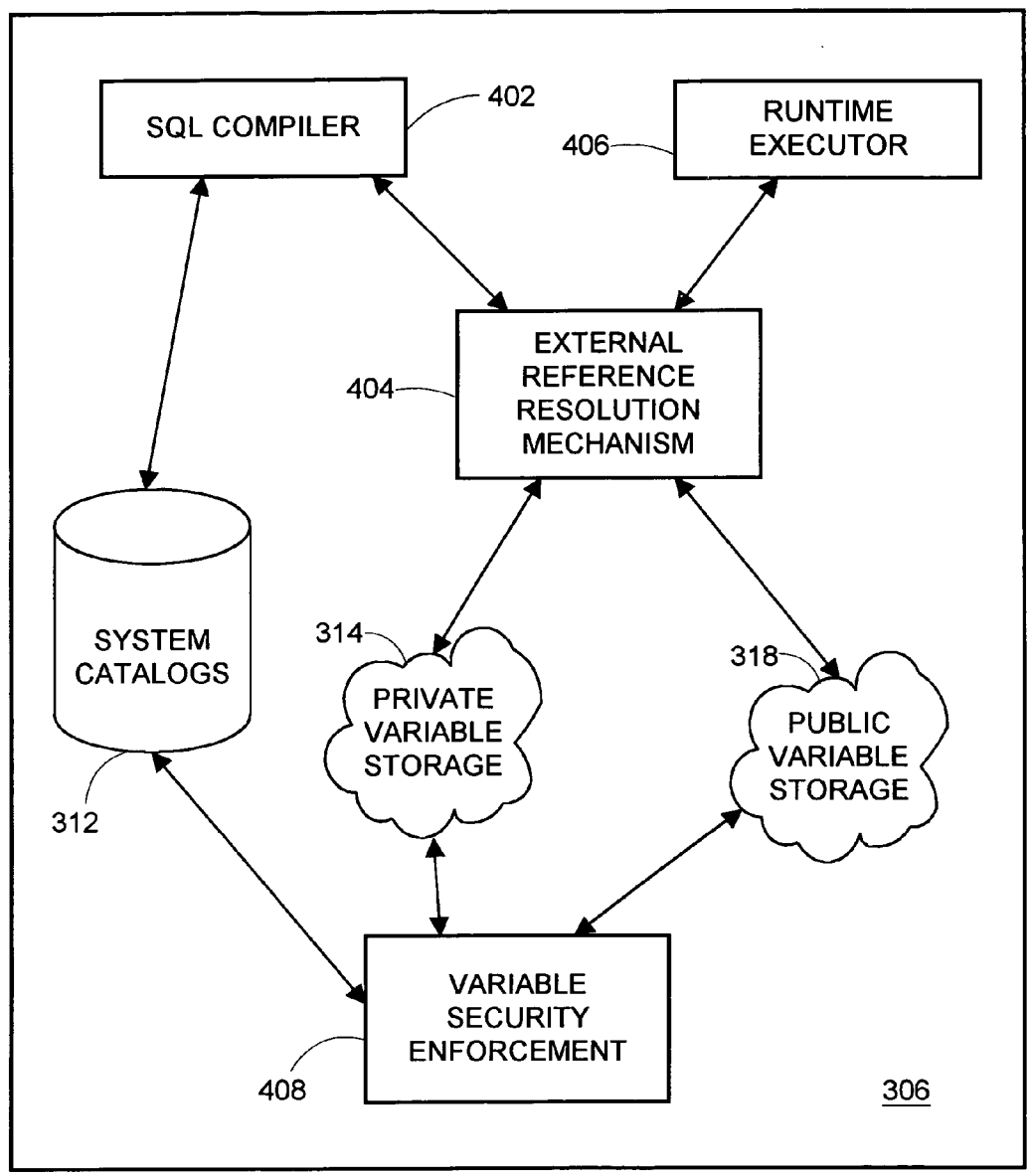
FIG. 4 illustrates a detailed structure of RDBMS memory illustrated in FIG. 3 which is used to support named memory variables.

FIG. 4 illustrates in greater detail processing components of RDBMS 306 adapted to support named memory variables. RDBMS 306 typically includes an SQL compiler 402, an external reference resolution mechanism 404, a runtime executor 406 and a session variable security enforcement component 408.

The SQL compiler 402 is used to analyze SQL statements that are submitted to RDBMS 306 prior to execution to determine the semantics and most efficient approach. In order to properly process SQL statements, including understanding of the statement's objective and creation of the executable format that correctly matches this objective, each attribute of any database object referenced within a SQL statement, for example, a table, view, or special register, must be known by the SQL compiler 402. If the SQL compiler 402 identifies an unknown object which is not defined within the context of the SQL statement or within the system catalogs 312 of the RDBMS 306, the SQL compiler 402 refers to the external reference resolution mechanism 404 to identify the object. On receipt of a request from the SQL compiler 402, the external reference resolution mechanism 404 attempts to resolve the reference to a number of different entities, including session variables. In order to resolve a named memory variable reference, the external reference resolution mechanism 404 looks within the private variable storage 314 or public variable storage 318 to find a name match. In one embodiment of the invention, the variable name itself may indicate which storage area is to be searched, or, alternatively, both areas are searched in a defined search hierarchy (determined by the RDBMS implementation). Once all objects in the SQL statement are known, an executable form of the section may be constructed and made available to proceed for execution by the runtime executor 406.

During execution, any named variable referenced by the statement may be resolved by having the external reference resolution mechanism 404 called to locate the variable in the appropriate storage area and acquire the data value.

If an attempt is made to read or modify a secure variable's contents by an SQL statement, variable security enforcement component 408 is invoked to validate rights to use the secure variable. Security may be enforced in accordance with well-known techniques, such as MAC/DAC. The authorization information of the user seeking to use the secure variable may be evaluated and compared with information in the system catalogs 312 to determine if the necessary authority is held. Similarly, if an attempt is made to create or drop a variable's contents by an SQL statement, variable security enforcement component 408 is invoked to validate the statement, comparing the attempting user's authorization ID with information in system catalogs 312.

Figure 5:
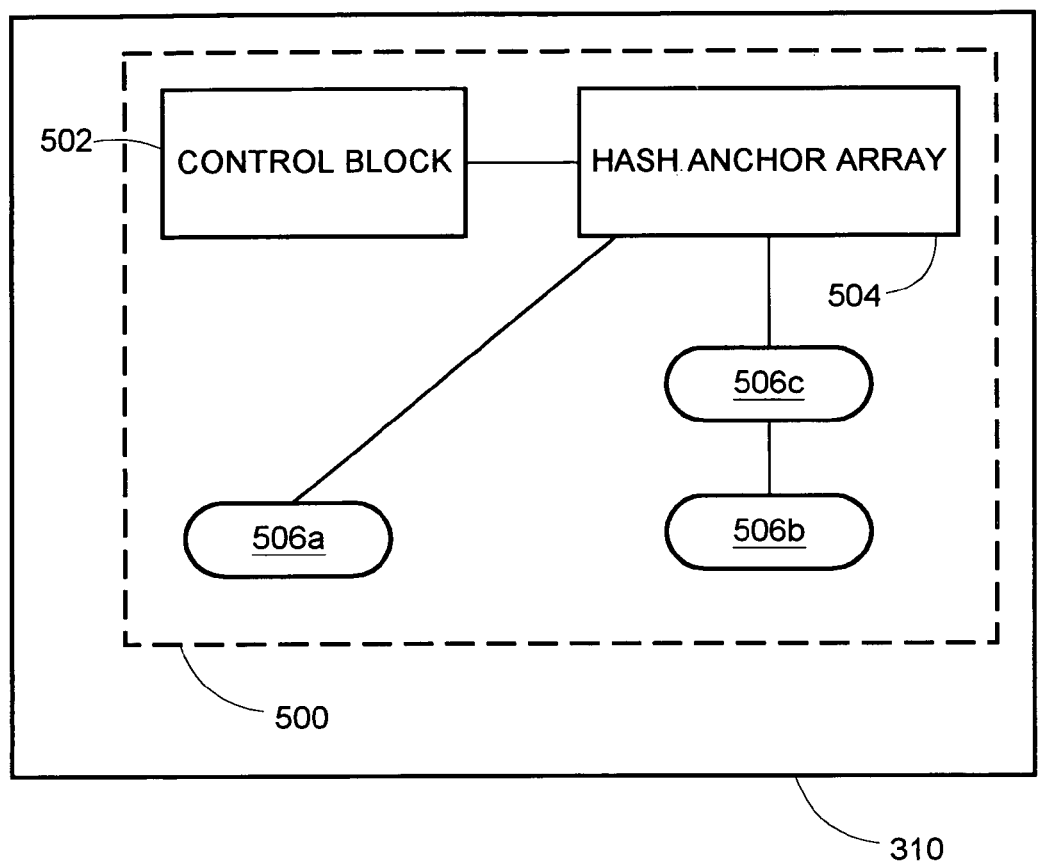
FIG. 5 schematically illustrates an exemplary structure of the variable storage for storing private variables and/or public variables.

FIG. 5 schematically illustrates an exemplary structure 500 for storing named variables (either public or private) in named variable storage space 310. Structure 500 has a storage area control block 502 from which depends a hash anchor array 504. The hash anchor array 504 has a plurality of anchor points from which the individual named memory variables depend in a linked list, for example, of variable structures 506a, 506b and 506c. When resolving a reference to a named variable, the name of the variable is hashed to find its anchor point in the hash anchor array 504. Then, the list of variable structures off that anchor is searched for a matching variable name.

Storage structure 500 is useful to store both private and public named memory variables that use the same namespace, so that duplicate names can be detected. Each individual variable structure (e.g. 506a, 506b and 506c) has unique information about the variable, including the name of the variable, the data type and the length of variable, the pointer to the current data value contained by the variable and an indicator as to whether or not the variable is a secure variable.

Figure 6:
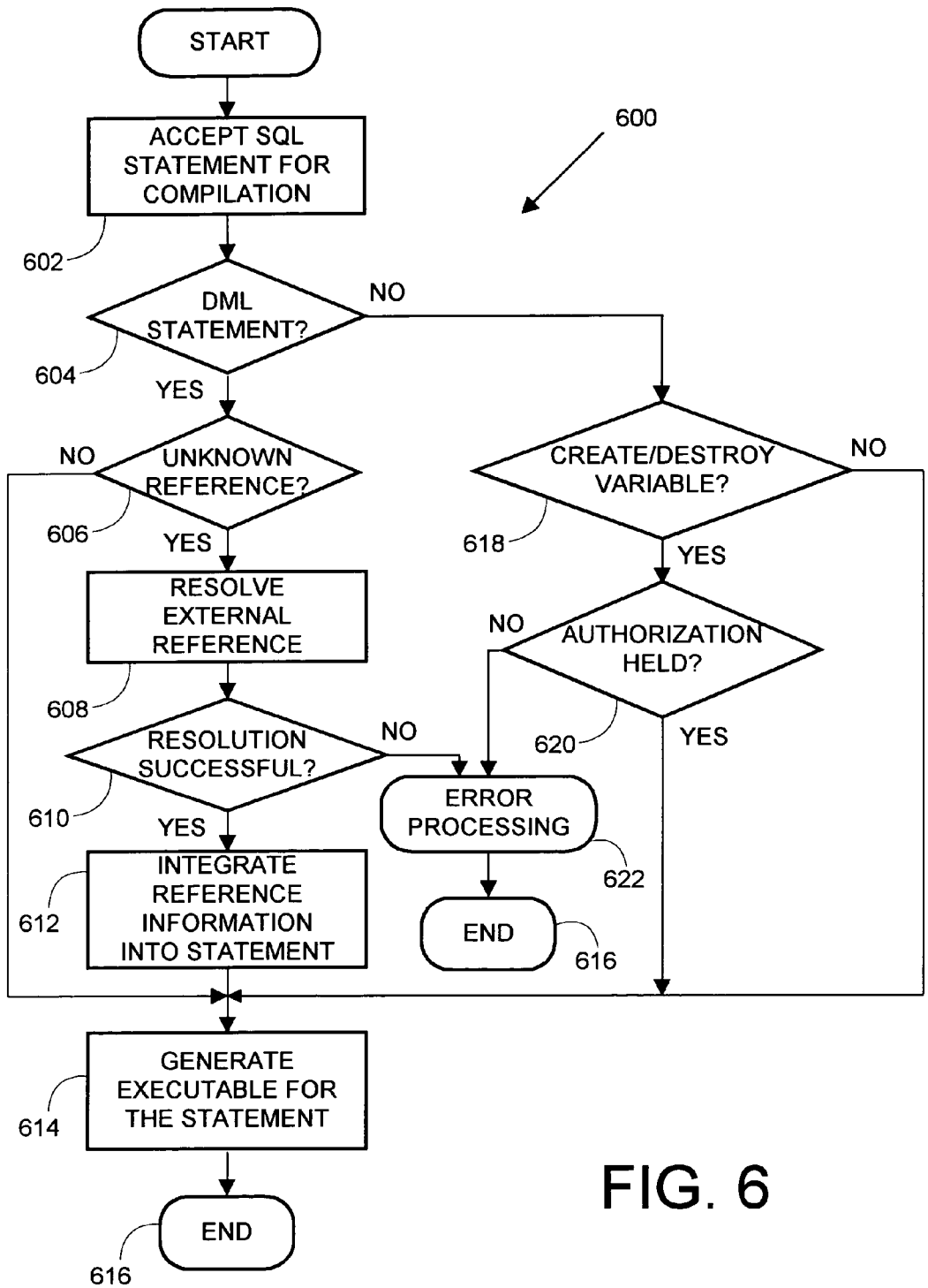
FIG. 6 is a flowchart illustrating the main operational steps involved in compiling reference to a session variable.

FIG. 6 is a flowchart illustrating operations 600 involved in compiling references to a named memory variable. On receipt of an SQL statement, the SQL compiler 402 of RDBMS 306 accepts the SQL statement for compilation (Step 602). The compiler 402 identifies whether the received statement includes a data manipulation language (DML) statement, such as a SELECT, INSERT, UPDATE, or DELETE statement (Step 604). If a DML statement is identified, the compiler 402 checks as to whether or not the references therein are known (Step 606). Unknown references are resolved using the external reference resolution mechanism 404 (Step 608). If external references are resolved successfully (Step 610), the reference information is integrated into the statement representation (Step 612) to generate an executable form of the statement. When an executable version of the SQL statement has been generated (Step 614) for further processing by the runtime executor 406, the accepted SQL statement is considered to be prepared (Step 616). If during Step 610 the reference cannot be resolved, error processing is undertaken (Step 622).

If, at Step 604, the accepted SQL statement is identified as not being a DML statement, the compiler 402 identifies whether the received SQL statement includes a reference to create or drop (destroy) statement for a named variable (Step 618). If yes, the authorization for the ID executing the accepted SQL statement must be verified (Step 620). If the accepted SQL statement successfully passes the authorization evaluation (Step 620), the SQL statement is processed to produce an executable version of the statement (Step 614). If the accepted SQL statement does not pass an authorization evaluation (Step 620), error processing is undertaken (Step 622). If the compiler 402 identifies that the received SQL statement does not include a statement to create or drop a named variable (Step 618), the accepted SQL statement is processed in a normal fashion used to produce an executable version of the statement (Step 614).

Figure 7:
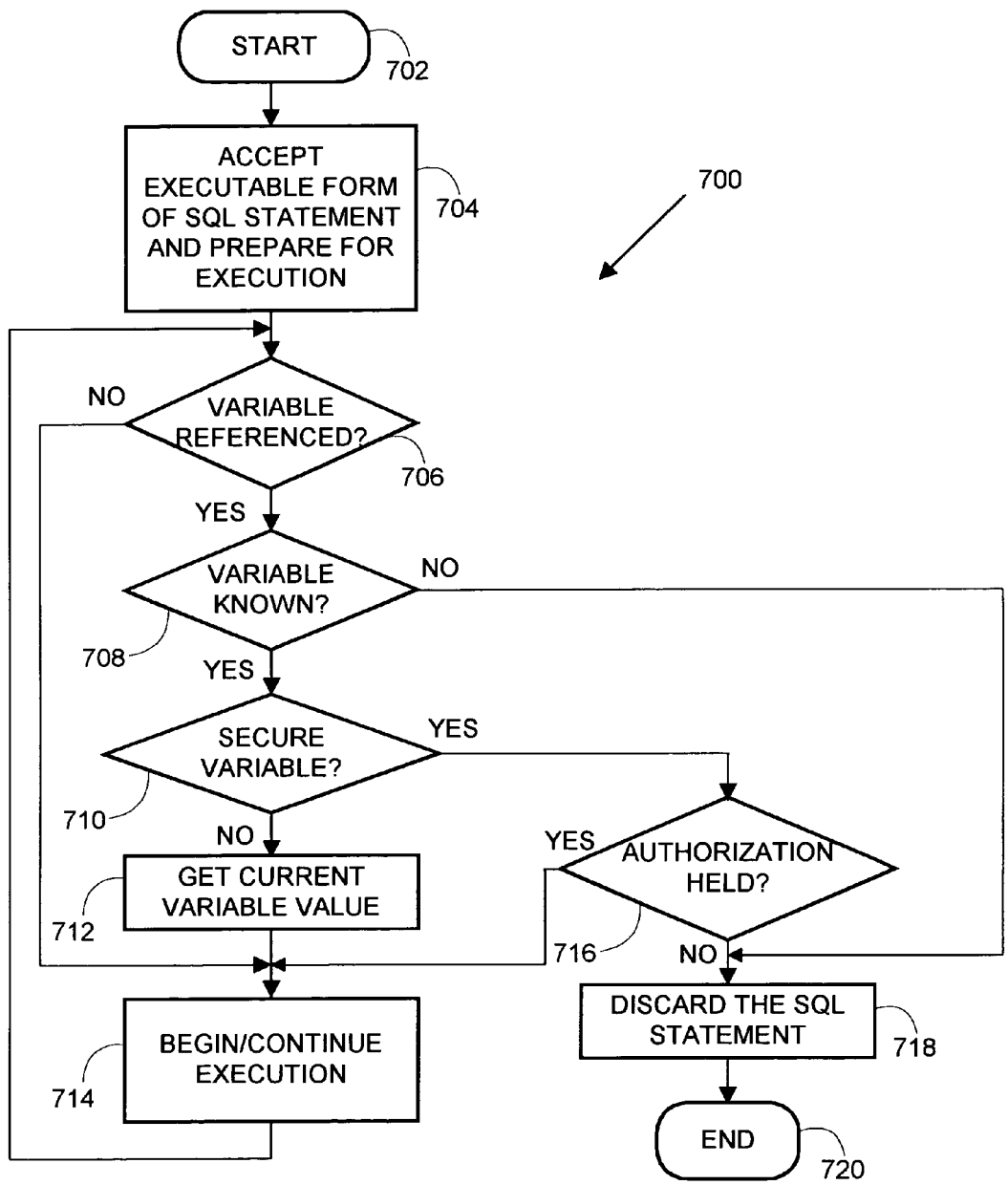
FIG. 7 is a flowchart illustrating the basic operational steps involved in execution of the executable version of an SQL statement.

FIG. 7 is a flowchart illustrating operations 700 involved in execution of the executable version of the SQL statement generated in Step 614 of FIG. 6. After starting RDBMS 306, the runtime executor 406 is ready (Step 702) to accept an executable form of an SQL statement (Step 704). On receipt of the executable form, the statement is checked for a reference to a session variable (Step 706). If there is such a reference, the runtime environment is checked as to whether or not the referenced variable is known (Step 708), for example, by using reference resolution mechanism 404. If it is known, the variable is checked as to whether or not it a secure variable (Step 710). If the variable is not secure, the current value of the variable is read (Step 712) and returned to the executable for further processing (Step 714) of the SQL statement. Then, further processing of the SQL statement continues (Step 714), returning to step 706 to see if the statement contains another variable reference.

If a variable reference cannot be resolved by the reference resolution mechanism at Step 708, the SQL statement is discarded, receiving a processing error (Step 718) and processing of the SQL statement is ended (Step 720).

If the referenced variable is identified as secure (Step 710), then the authorization of the ID being used to execute the SQL statement is evaluated for authorization to access the variable (Step 716). Successful authorization proceeds to Step 714 where the execution of the SQL statement begins or continues. If the authorization step fails (Step 716) the SQL statement is discarded, receiving a processing error (Step 718) and processing of the variable reference is ended (Step 720).

The system and method for supporting named memory variables in a relational database in accordance with the present invention provides PUBLIC and PRIVATE named memory variables, which are available to any SQL statement within the relational database. PUBLIC and PRIVATE named memory variables can be used for transferring information between SQL statements of one or more sessions or for retrieving system information of the relational database. Both PUBLIC or PRIVATE types can be defined as SECURE named memory variables which have specific privileges required to read or write to them.

The system and method for supporting named memory variables in a relational database can enhance the flexibility of the relational database.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for sharing information between SQL queries, in a relational database management system (RDBMS), the method comprising:

maintaining a user-defined named memory variable and an associated value in an allocated portion of a memory coupled to the RDBMS, said named memory variable facilitating the transfer of the associated value between two or more separate queries, said named memory variable defined in response to a SQL statement received from a client application coupled to the RDBMS and said named memory variable comprising a variable name, a data type, and variable attributes, the variable attributes set by a user and defining one of a private named memory variable and a public named memory variable, said private named memory variable having a unique value for each database session and said public named memory variable having a common value for a plurality of database sessions and shared by a plurality of client applications communicating within the plurality of database sessions;

accessing the associated value for the named memory variable in response to a first query referencing the named memory variable;

sending a result for the first query, the result based on the associated value;

accessing the associated value for the named memory variable in response to a second query referencing the named memory variable; and sending a result for the second query, the result based on the associated value.

2. The method according to claim 1, wherein the associated value for the named memory variable is accessed in response to a direct reference to the named memory variable in the first query.

3. The method according to claim 1, wherein groups of queries are associated in one or more sessions.

4. The method according to claim 1, wherein accessing the associated value for the named memory variable further comprises determining that a user associated with the query satisfies one or more authorization privileges prior to accessing the associated value.

5. The method according to claim 4, wherein the authorization privileges are selected from the group comprising READ, WRITE, and WITH GRANT OPTION to grant privileges to others.

6. The method according to claim 1, further comprising storing named variable information for said named memory variables to a system catalog coupled to the RDBMS and wherein maintaining a named memory variable comprises referencing named variable information in said system catalog.

7. The method according to claim 6, wherein the named variable information comprises at least one of a variable name; a data type; a maximum length of the variable; a scale of the variable; an indication whether a value for the named memory variable may change during an execution of the query; duration for the value; and an initial default value for the named memory variable.

8. The method according to claim 1, further comprising
accessing predetermined information for a predefined named memory variable in response to a query referencing the predefined named memory variable; and
sending a result for the query, the result based on the associated value.

9. A computer program product comprising a computer readable storage medium having computer usable program code executable by a processor to perform operations for sharing information between two or more separate SQL queries in a relational database management system (RDBMS), the operations of the computer program product comprising:
maintaining a user-defined named memory variable and an associated value in from an allocated portion of a memory coupled to the RDBMS, said user-defined named memory variable facilitating the transfer of the associated value between two or more separate queries, said user-defined named memory variable defined in response to a SQL statement received from a client application coupled to the RDBMS, said associated value set in response to a SQL statement received from a client application coupled to the RDBMS and said named memory variable comprising a variable name, a data type, and variable attributes, wherein the variable attributes are set by a user and define one of a private named memory variable and a public named memory variable, said private named memory variable having a unique value for each database session and said public named memory variable having a common value for a plurality of database sessions and shared by a plurality of client applications communicating within the plurality of database sessions;
accessing the associated value for the user-defined named memory variable in response to a first query referencing the user-defined named memory variable;
sending a result for the first query, the result based on the associated value;
accessing the associated value for the user-defined named memory variable in response to a second query referencing the user-defined named memory variable, the second query separate from the first query; and
sending a result for the second query, the result based on the associated value.

10. The computer program product of claim 9, wherein the associated value for the user-defined named memory variable is accessed in response to a GETVARIABLE function recited in the first query.

11. The computer program product of claim 9, wherein accessing the associated value for the user-defined named memory variable further comprises determining that a user associated with the query satisfies one or more authorization privileges prior to accessing the associated value.

12. The computer program product of claim 11, wherein authorization privileges are selected from the group comprising READ, WRITE, and WITH GRANT OPTION to grant privileges to others.

13. The computer program product of claim 9, further comprising storing named variable information for said user-defined named memory variables to a system catalog coupled to the RDBMS and wherein maintaining a user-defined named memory variable comprises referencing named variable information in said system catalog.

14. The computer program product of claim 13, wherein the named variable information comprises at least one of a variable name; a data type; a maximum length of the variable; a scale of the variable; an indication whether a value for the named memory variable may change during an execution of the query; duration for the value; and an initial default value for the named memory variable.

15. The computer program product of claim 9, further comprising
accessing predetermined information for a predefined named memory variable in response to a query referencing the predefined named memory variable; and
sending a result for the query, the result based on the associated value.

16. A relational database management system (RDBMS) for sharing information between two or more separate SQL queries, the system, comprising:
a processor configured to execute programmed instructions;
a memory couple to the processor, the memory comprising programmed instructions that the processor executes, the programmed instructions configured to execute a method for sharing information between two or more separate SQL queries, the method comprising,
receiving a first query, the first query referencing a user-defined named memory variable, the user-defined named memory variable having an associated value, said user-defined named memory variable defined in the memory in response to a SQL CREATE statement received from a client application coupled to the RDBMS, said associated value set in the memory in response to a SQL statement received from a client application coupled to the RDBMS and said named memory variable comprising a variable name, a data type, and variable attributes, the variable attributes set by a user and defining one of a private named memory variable and a public named memory variable, said private named memory variable having a unique value for each session and said public named memory variable having a common value for a plurality of database sessions and shared by a plurality of client applications communicating within the plurality of database sessions;
accessing the associated value for the user-defined named memory variable in response to the first query referencing the user-defined named memory variable by way of a direct reference to the user-defined named memory variable in the first query;

sending a result for the first query to a client application, the result comprising the associated value;

in response to the user-defined named memory variable defined as a PRIVATE user-defined named memory variable, accessing the associated value for the user-defined named memory variable in response to a second query that is a member of an individual database session within which the SQL CREATE statement is received from the client application and sending a result for the second query, the result based on the associated value, the second query referencing the named memory variable;

in response to the user-defined named memory variable defined as a PUBLIC user-defined named memory variable, accessing the associated value for the user-defined named memory variable in response to a second query referencing the user-defined named memory variable and sending a result for the second query, the result based on the associated value, the SQL CREATE statement designating the user-defined named memory variable as a PUBLIC user-defined named memory variable accessible to each query received by the RDBMS by a plurality of client applications.

17. The system of claim 16, wherein the user-defined named memory variable is defined as a SECURE user-defined named memory variable, further comprising, determining whether a user associated with the first query satisfies one or more authorization privileges defined for the SECURE user-defined named memory variable;

accessing the associated value for the SECURE user-defined named memory variable in response to the first query satisfying one or more authorization privileges and the first query referencing the SECURE user-defined named memory variable; and sending a result for the first query, the result based on the associated value.

18. The system of claim 17, wherein the authorization privileges are selected from the group comprising READ, WRITE, and WITH GRANT OPTION to grant privileges to others.

19. The system of claim 16, further comprising storing named variable information for said named memory variables to a system catalog coupled to the RDBMS and wherein accessing the associated value for the named memory variable comprises referencing named variable information in said system catalog.

20. The system of claim 16, wherein the named variable information comprises at least one of a variable name; a data type; a maximum length of the variable; a scale of the variable; an indication whether a value for the named memory variable may change during an execution of the query; duration for the value; and an initial default value for the named memory variable.

21. The system of claim 16, further comprising, accessing predetermined information for a predefined named memory variable in response to a second query referencing the predefined named memory variable; and sending a result for the second query, the result based on the associated value.

* * * * *